Patented Feb. 6, 1934

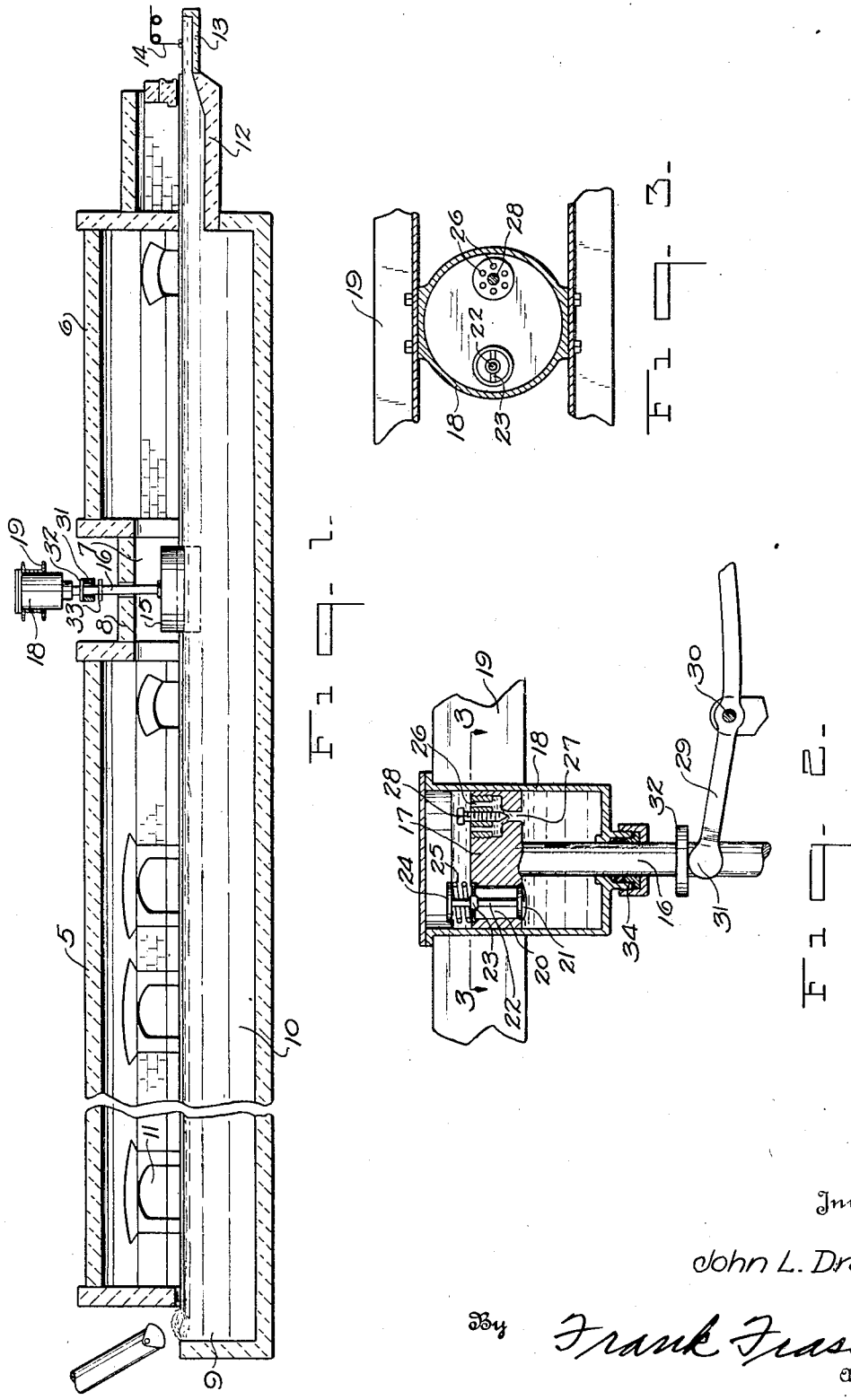

1,945,601

UNITED STATES PATENT OFFICE 1,945,601

GLASS APPARATUS

John L. Drake, Toledo, Ohio, assignor to Libbey-Owens-Ford Glass Company, Toledo, Ohio, a corporation of Ohio Application August 11, 1927. Serial No. 212,210

3 Claims. (Cl. 49—54)

This invention relates broadly to glass apparatus and more particularly to an improved glass melting furnace.

An important object of the present invention is to provide a glass tank furnace having means associated therewith whereby the molten glass contained therein may be maintained at a constant level at all times.

Another object of the invention is to provide a tank furnace containing a mass of molten glass with means for removing glass from said mass, the apparatus including means associated with said furnace for maintaining the level of the molten glass therein constant at all times by displacing an amount of glass equal to the amount of glass being removed.

A further object of the invention is to provide a glass tank furnace wherein batch ingredients are preferably introduced into one end thereof periodically and the resultant molten glass continuously removed from the opposite end, and means for displacing an amount of glass equal to the glass being removed, said means being raised during the filling-in of the batch ingredients and then permitted to gradually lower into the molten glass to displace a gradually increasing volume of glass which is equal to the volume of glass being gradually removed.

Other objects and advantages of the invention will become more apparent during the course of the following description when taken in connection with the accompanying drawing.

In the drawing forming a part of this application and wherein like numerals are employed to designate like parts throughout the same, Fig. 1 is a longitudinal vertical section through a glass tank furnace showing the present invention associated therewith.

Fig. 2 is a vertical section through a valve mechanism, and

Fig. 3 is a section taken substantially on line 3—3 of Fig. 2.

The tank furnace provided by the present invention includes a melting end or chamber 5 and a refining end or chamber 7, the two being connected by a connecting portion 7, the cap or roof 8 of which may, if desired, be lowered closer to the molten glass than the caps of the melting end and refining end. Also, if preferred, the connecting portion may be made narrower than the melting end and refining end to form a neck therebetween. However, it is to be understood that the invention is not to be restricted to use in connection only with the particular type of furnace disclosed but may be used just as satisfactorily in furnaces of varying constructions.

The furnace illustrated in the drawings by way of example is provided at the melting end 5 thereof with an open compartment or dog house 9 for receiving the glass batch ingredients which are melted within said melting end to form the mass of molten glass 10, this melting being preferably accomplished by means of gas flames entering the furnace through ports 11 from regenerators located at opposite sides thereof.

Preferably associated with the refining end 6 is a cooling chamber 12 to which may be connected a working receptacle or draw pot 13. The molten glass after being produced within the melting end 5 is adapted to flow through the refining end 6 and cooling chamber 12 into the working receptacle 13 from which it may be continuously removed in sheet form as at 14.

It is a common practice in furnaces of this type to introduce the glass batch ingredients into the dog house 9 at regular intervals, usually about once every twenty minutes, the amount of batch being introduced at one filling-in being considerable. Since the glass batch is periodically fed into one end of the furnace and the molten glass continuously removed from the opposite end, it will be evident that the level of the molten glass within said furnace will not remain the same at all times but instead will be somewhat lower at the end of the twenty minute period than just after the filling-in has been accomplished. Consequently, the continuous removal of the molten glass at one end of the furnace and the periodical filling-in of the batch ingredients at the opposite end tends to keep the level of the molten glass within the furnace constantly changing, which is an undesirable condition.

It is the aim of the present invention to provide means for maintaining the level of the molten glass within the furnace relatively constant at all times by displacing an amount of glass equal to the glass being removed. To this end, there is arranged within the furnace a glass displacing member or slab 15 preferably of a refractory material and carried at the lower end of a vertical shaft 16, said shaft extending upwardly through the cap 8 of the connecting portion 7 of the furnace and having secured to its upper end a plunger 17 operable within a preferably cylindrical housing 18, which housing is suitably supported between channel beams or the like 19 and is adapted to contain a suitable liquid.

The plunger 17 is provided with a relatively large vertical opening 20 adapted to be closed upon downward movement of said plunger by a valve 21 carried by a valve stem 22 slidable within a bearing 23 and carrying a plate 24 at its upper end. A spring 25 encircling the valve stem 22 bears at its opposite ends against the said bearing 23 and plate 24 to normally urge the latter upwardly to retain the valve 21 in closed position so as to prevent the passage of the liquid through the opening 20.

The plunger 17 is also provided at a point preferably diametrically opposite the opening 20 with a series of relatively small openings 26 communicating with a single larger opening 27 controlled by a needle valve 28. The member or slab 15 may be raised by means of a lever 29 pivotally mounted intermediate its ends as at 30 and having its forked end 31 embracing the shaft 16 and adapted to engage a collar 32.

In operation, during the filling-in of the batch ingredients the member or slab 15 is raised slightly by operation of the lever 29. When the slab is raised, the plunger will naturally be moved upwardly within the housing 18 and upon such movement, the pressure of the liquid upon the plate 24 will force the same downwardly against the action of the spring 25 to open the valve 21 so that the liquid above the plunger may flow through the opening 20 into the lower end of the housing beneath said plunger.

After the filling-in has been completed, the lever 29 is released and the needle valve 28 so regulated that the member 15 will be permitted to gradually settle within the molten glass so as to displace a gradually increasing volume of glass which will be equal to the volume of glass being gradually removed at 14. During the lowering of the slab 15, the valve 21 will be held closed by the spring 25 so that the liquid must pass upwardly through the openings 26 and 27. Consequently, while molten glass is being constantly removed from one end of the furnace, the weight or slab 15 is gradually sinking within the molten glass so that the level of the said molten glass 10 will remain relatively constant. A pin or the like 33 passing through shaft 16 may be provided for limiting downward movement of the forked end of lever 29.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus of the character described, means for diminishing the lowering of the level of a body of molten glass in a tank during the removal of glass therefrom, including a vertically movable displacing member, a vertical shaft carrying said member at its lower end, a housing for receiving the upper end of the shaft therein, a plunger carried by said shaft within said housing, and fluid actuated valve mechanism carried by said plunger for causing a gradual lowering of the member to displace a gradually increasing volume of glass.

2. In apparatus of the character described, means for diminishing the lowering of the level of a body of molten glass in a tank during the removal of glass therefrom, including a vertically movable displacing member, a vertical shaft carrying said member at its lower end, a housing for receiving the upper end of the shaft therein, said housing being adapted to contain a liquid, a plunger carried by said shaft within said housing, a valve mechanism carried by the plunger and adapted to be opened upon raising of said member, and fluid actuated means for causing a gradual lowering of the member to displace a gradually increasing volume of glass.

3. In apparatus of the character described, means for diminishing the lowering of the level of a body of molten glass in a tank during the removal of glass therefrom, including a vertically movable displacing member, a vertical shaft carrying said member at its lower end, a housing for receiving the upper end of the shaft therein, said housing being adapted to contain a liquid, a plunger carried by said shaft within said housing, a valve mechanism carried by the plunger and adapted to be opened upon raising of said member whereby to cause the liquid to flow into the bottom of the housing beneath the plunger, and a needle valve arrangement for causing the liquid to gradually flow back into the space above the plunger so as to cause a gradual lowering of the member to displace a gradually increasing volume of glass.

JOHN L. DRAKE.